3,002,030
HALOGENATED ORGANIC COMPOUNDS
Murray Hauptschein, Glenside, and Milton Braid, Philadelphia, Pa., assignors to Pennsalt Chemicals Corporation, Philadelphia, Pa., a corporation of Pennsylvania
No Drawing. Filed July 9, 1958, Ser. No. 747,342
7 Claims. (Cl. 260—653)

This invention relates to the preparation of the iodide 1,2-dichloro-1,2,2-trifluoro-1-iodoethane $CF_2ClCFClI$ and to the use of this iodide in telomerization reactions.

The preparation of the iodide $CF_2ClCFClI$ by the addition of iodine monochloride (ICl) to the olefin $CF_2=CFCl$ at temperatures ranging from room temperature to 35° C. has been previously reported by Barr et al. (Journal of the American Chemical Society, vol. 73, page 1352, March 1951). Barr did not investigate the structure of his reaction product, but assigned the structure $CF_2ClCFClI$ by analogy to other addition reactions of the olefin $CF_2=CFCl$.

Robert N. Haszeldine (Journal of the Chemical Society, page 4423, 1952) has also reported the addition of iodine monochloride to the olefin $CF_2=CFCl$, the reaction being carried out at temperatures from 30° to 50° C. Haszeldine investigated the structure of his reaction product and concluded that it consisted exclusively of $CF_2ClCFClI$, and that it was free of the possible isomer $CFCl_2CF_2I$.

The use of the iodide $CF_2ClCFClI$ as a chain transfer agent in telomerization reactions has also been reported. See Robert N. Haszeldine, Journal of the Chemical Society, December 19, 1955, pp. 4291–4302; and Hauptschein et al., Journal of the American Chemical Society, vol. 79, pp. 2549–2553, 1957.

As reported by these prior workers, when the iodide $CF_2ClCFClI$ is reacted with $CF_2=CFCl$, telomers of the structure $CF_2ClCFCl(CF_2CFCl)_nI$ are produced where $n$ is an integer of the series 1, 2, 3, 4 etc. In each case the iodide $CF_2ClCFClI$ was prepared by the addition of ICl to $CF_2=CFCl$ at room temperature or slightly above.

Telomers of this type of intermediate molecular weight, that is, where the value of $n$ is in the range of from about 3 to 7, particularly after stabilization by replacement of the iodine with chlorine or fluorine, provide valuable oils of high chemical and thermal stability, useful as lubricants, hydraulic fluids and plasticizers for halogenated resins. The low molecular weight products, such as those in which $n$ is equal to 1 or 2 are light volatile liquids and do not have these valuable uses, while the higher molecular weight products, such as those in which the value of $n$ is 10 or more, are stiff waxy solids of limited utility.

In the preparation of telomers of this type, accordingly, it is highly desirable to obtain a maximum yield of telomers of intermediate molecular weight. It is difficult, however, to control the telomerization reaction to produce only the desired intermediate molecular weight products. Considerable amounts of unreacted starting iodide and some low molecular weight products such as those in which the value of $n$ is 1 or 2 are produced. To avoid waste of this mixture of relatively expensive unreacted iodide and low molecular weight telomer iodides, the mixture is desirably reacted again with further olefin in order to build-up the molecular weight to the desired intermediate range.

It was found, however, that when attempting to reuse the low products resulting from the reaction of $CF_2ClCFClI$ (prepared in accordance with the above described prior art procedures) with the olefin $CF_2=CFCl$, it was not possible to produce products containing satisfactory yields of the desired intermediate molecular weight products. While in certain cases when using the freshly prepared iodide reasonably good yields of these desired products were obtained, when attempting to reuse the unreacted iodide and low molecular weight telomers from this latter reaction, considerably higher temperatures were required for the reaction to proceed at a reasonable rate, and instead of good yields of intermediate molecular weight products, the product consisted mainly of relatively undesirable higher molecular weight waxy solids.

It has now been found in accordance with the present invention that these difficulties are caused by the heretofore unsuspected presence of substantial quantities of the isomeric iodide $CFCl_2CF_2I$ in the reaction product of iodine monochloride with $CF_2=CFCl$ when this reaction is carried out in accordance with the prior art procedures. By chromotographic separation, by infrared and ultraviolet spectroscopic analysis, and by differences in refractive indexes, it has been unambiguously shown that when iodine monochloride is reacted with $CF_2=CFCl$ at room temperatures and above, a mixture of two isomers having almost identical boiling points, namely, $$CF_2ClCFClI$$

and $CFCl_2CF_2I$ is produced, the latter isomer being produced in amounts of about 30% and greater.

It has been determined that the unsuspected presence of these substantial amounts of the isomer $CFCl_2CF_2I$ is responsible for the unsatisfactory results obtained when attempting to reuse the mixture of unreacted iodide and low molecular telomer iodides from the reaction of freshly prepared iodide with olefin. The isomer $CFCl_2CF_2I$ is apparently a considerably less reactive chain transfer agent than the isomer $CF_2ClCFClI$ and because of this requires higher temperatures to initiate and sustain the telomerization reaction, and tends to produce higher molecular weight products. Thus, when reacting the freshly prepared mixture (prepared in accordance with prior art procedures and containing e.g. 30% $CFCl_2CF_2I$ and 70% $CF_2ClCFClI$), the isomer $CF_2ClCFClI$ is preferentially used up in the reaction because of its greater reactivity, while the isomer $CFCl_2CF_2I$ accumulates. When attempting to reuse the mixture of unreacted iodide and low molecular weight products from the first reaction, which now contains large amounts of the unreacted isomer $CFCl_2CF_2I$, higher temperatures are required to initiate and sustain the reaction, and higher molecular weight products of relatively low utility are produced.

In accordance with the present invention a method has now been found for preparing the isomer $CF_2ClCFClI$ by the reaction of iodine monochloride with $CF_2=CFCl$ which produces a product containing less than 10% of the less reactive isomer $CFCl_2CF_2I$, and according to preferred procedures of the invention containing only 2 to 3% or less of this latter isomer. According to this new method iodine monochloride is reacted with the olefin $CF_2=CFCl$ at low temperatures, namely, temperatures ranging from −40° C. to +10° C. and preferably from −20° C. to 0° C. At these temperatures the formation of the iodide $CFCl_2CF_2I$ is greatly decreased in contrast to the large amounts found when the reaction is carried out at room temperature or higher. As will be pointed out in more detail hereafter, the reaction product obtained under these conditions is greatly improved with respect to its utility as a telogen in carrying out telomerization reactions.

To avoid the formation of the isomer $CFCl_2CF_2I$ it has also been found desirable to avoid the presence of iron in a form that is chemically attacked by the reaction mixture or products. Thus, when the reaction is carried out, even at low temperatures, in the presence of a reactive form of metallic iron, such as metallic iron gauze, the major product of the reaction may be the isomer CFCl₂CF₂I. Even the use of metallic iron vessels, such as iron autoclaves, or metallic iron stirrers, which are chemically attacked by the reaction mixture or products, may favor the production of undesirably large quantities of the isomer $CFCl_2CF_2I$ even at low temperatures. The presence of iron in a form that is not chemically attacked, such as the use of iron alloy equipment, is not generally detrimental. Thus, for example, a Monel metal autoclave, consisting predominantly of an alloy of nickel and copper and containing e.g. 1 to 7% iron alloyed therewith, may be employed.

The reaction may be carried out at any convenient pressure, the reaction presure not being critical. It may be carried out, for example, at atmospheric pressure or under elevated pressures up to practical limits, such as 50,000 pounds per square inch gauge.

Since iodine monochloride is a solid at the reaction temperatures employed, a solvent will generally be employed which is a liquid at the reaction temperature and in which both the iodine monochloride and the reaction product are soluble. A preferred solvent is the product itself, namely, $CF_2ClCFClI$, thus eliminating the necessity for separating the product from an extraneous solvent after the reaction. However, if desired, other solvents, generally halogenated solvents, particularly methylene chloride, $CH_2Cl_2$ or others such as chloroform, $CHCl_3$ may be employed.

The reaction time is not critical. Depending somewhat upon the reaction temperature, reaction periods from 1 to 5 hours and more usually, from 2 to 4 hours are sufficient.

The molar ratios likewise are not critical. However, for convenience and economy of operation, molar ratios of iodine monochloride to $CF_2=CFCl$ of from 1:2 to 2:1 will generally be preferred.

On a large scale the reaction is preferably carried out by bubbling the gaseous olefin $CF_2=CFCl$ through the iodine monochloride dissolved in $CF_2ClCFClI$ while maintaining the desired reaction temperature by cooling. Olefin that does not dissolve or react may be recycled. The use of an excess of olefin is preferred, and the contact of the olefin with the iodine monochloride in solution is preferably continued until all of the iodine monochloride has reacted. The reaction product may then be distilled, if desired, to remove unreacted olefin as well as $CF_2ClCFCl_2$ which may be present in minor quantities as a byproduct of the reaction. If an auxiliary solvent such as methylene chloride is employed, this may be separated from the reaction product $CF_2ClCFClI$ by distillation also.

Another procedure that may be employed is to add ICl to an excess of the liquified olefin at e.g. $-10°$ C., desirably under slight pressure, e.g. 2–4 atmospheres. After the reaction is complete, excess olefin may be distilled off leaving the product iodide in the reaction vessel.

If in any case all of the iodine monochloride is not reacted, the unreacted ICl may be removed by washing with water, preferably by pouring the reaction mixture over crushed ice. The iodine monochloride decomposes into products soluble in the water layer such as HCl and HOI as well as solid iodine which may then be separated from the product iodide.

The following examples illustrate the process of the invention the product obtained thereby, and the critical effect of reaction temperature upon the relative amounts of the two isomers $CF_2ClCFClI$ and $CFCl_2CF_2I$.

EXAMPLE 1

*Reaction of ICl and $CF_2=CFCl$ at $-8°$ to $-5°$ C.*

To 415 grams (3.56 mols) of chlorotrifluoroethylene condensed in a 3 liter flask and cooled by a Dry Ice-acetone bath there is added over a period of ¾ of an hour, while stirring, 500 grams (3.08 mols) of iodine monochloride (ICl) dissolved in 750 cc. of methylene chloride. The temperature of the reaction mixture is allowed to rise to $-8°$ C. to $-5°$ C. and is maintained at this temperature for 4 hours by refluxing of the excess olefin (employing a Dry Ice-cooled condenser).

The excess olefin is then allowed to boil off, and the reaction mixture is washed first with water, then with saturated aqueous sodium bisulfite solution, then again with water and then dried with anhydrous calcium sulfate.

The methylene chloride solvent is removed by distillation, and there is obtained 430 grams of crude $C_2Cl_2F_3I$. This is shown to consist of a mixture of the isomers $CF_2ClCFClI$ and $CFCl_2CF_2I$ by vapor-liquid partition chromatographic analysis using a Perkin Elmer B column 2 liters in height at 75° C. under pressure of helium of 30 lbs./in.² gage. Using this method, the elution times for air, the isomer $CF_2ClCFClI$ and the isomer $$CFCl_2CF_2I$$

are respectively 0.55 minute, 27 minutes and 24.5 minutes. By this method the composition of the product is shown to be 98% of the isomer $CF_2ClCFClI$ and 2% of the isomer $CFCl_2CF_2I$. This product has a boiling point of 101° C. at atmospheric pressure, and a refractive index at 25° C. of $n_D^{25}$ 1.4492.

Pure samples of the two isomers are obtained by chromatographic separation. The principal isomer $CF_2ClCFClI$ has a refractive index at 25° C. of $n_D^{25}$ 1.4493, a density at 25° C. (related to water at 4° C.) $d_4^{24}$ 2.199 and a molar refraction at 25° C. of $MR_D^{25}$ 34.03. The molar refraction is given by the following formula:

$$MR_D^T = \frac{n^2-1}{n^2+2} \frac{M}{d}$$

where $n$ is refractive index at temperature T (measured with reference to the D-line of sodium), where M equals the molecular weight and where $d$ equals the density at temperature T.

The principal absorption maxima for the isomer $CF_2ClCFClI$ in the infrared spectrum are $8.34\mu$ (strong)—$8.49\mu$ (very strong) (doublet); $9.07\mu$ (very strong); $9.67\mu$ (strong); $11.48\mu$ (medium strong); $12.02\mu$ (strong); $12.50\mu$ (medium strong); and $13.52\mu$ (very, very strong). The absorption maximum of this isomer in the ultraviolet spectrum taken in isooctane is at 286.0 m$\mu$.

The isomer $CFCl_2CF_2I$ has a refractive index at 25° C. $n_D^{25}$ 1.4446, a density of 25° C. (referred to water at 4° C.) of $d_4^{25}$ 2.189 and a molar refraction at 25° C. $MR_D^{25}$ 33.88.

The infrared spectrum of this isomer has absorption maxima at $8.46\mu$ (strong) and $8.63\mu$ (very strong) (doublet); $9.02\mu$ (very strong); $9.85\mu$ (strong); and $9.95\mu$ shoulder (doublet); $11.08\mu$ (very strong); $11.85\mu$ (medium); $12.8\mu$ (weak); and $13.3\mu$ (very, very strong). The absorption maximum of this isomer in the ultraviolet spectrum taken in isooctane is at 274 m$\mu$.

These isomers boil within 1° C. of one another (approximately 101° C. at 760 mm. Hg) and are difficult or impossible to separate by fractional distillation. The isomer $CFCl_2CF_2I$ appears to be slightly lower boiling as shown by the enrichment of successive fractions in the isomer $CF_2ClCFClI$ during distillation, as well as the shorter elution time for the isomer $CFCl_2CF_2I$ during chromotographic analysis.

EXAMPLE 2

*Reaction of $CF_2=CFCl$ with ICl at $-8$ to $-5°$ C.*

The reaction of Example 1 was repeated at the same temperature but using a different procedure. 589 g. of iodine monochloride dissolved in 400 grams of $CF_2ClCFClI$ prepared by the method of the previous example is placed in a glass flask. While maintained at −8 to −5° C., 500 grams of chlorotrifluoroethylene is bubbled through this solution for several hours. Unreacted olefin, which is collected in receivers cooled at −78° C., is recycled until all of the ICl is reacted. After removal of unreacted olefin and some $CF_2ClCFCl_2$ by distillation, there remains about 1300 grams of product shown by vapor-liquid partition chromatographic analysis to consist of 98% of the isomer $CF_2ClCFClI$ and 2% of the isomer $CFCl_2CF_2I$.

Using the same procedure and at the same temperature, chlorotrifluoroethylene is reacted with iodine monochloride in nickel and Monel metal autoclaves to produce reaction products consisting of approximately 98% of the isomer $CF_2ClCFClI$.

EXAMPLE 3

*Reaction of $CF_2=CFCl$ with ICl at 0° C.*

Chlorotrifluoroethylene is bubbled through a solution of iodine monochloride in methylene chloride for a period of three hours while maintaining the reaction mixture at a temperature of 0° C. The reaction mixture is washed with water, and then dried with anhydrous calcium sulfate. Methylene chloride is removed by distillation. Vapor-liquid partition chromatographic analysis of the product shows a content of 97% $CF_2ClCFClI$ and 3% $CFCl_2CF_2I$.

EXAMPLE 4

*Reaction of $CF_2=CFCl$ with ICl at +15° to +20° C.*

Example 3 was repeated except that $CF_2ClCFCl_2$ was use as a solvent and during most of the reaction, the reaction temperature was maintained at from +15 to +20° C. After working up the product as in Example 3, vapor-liquid partition chromatographic analysis shows a content of 79% of the isomer $CF_2ClCFClI$ and 21% of the isomer $CFCl_2CF_2I$.

EXAMPLE 5

*Reaction of $CF_2=CFCl$ with ICl at 30° C.*

Iodine monochloride for the reaction is prepared by introducing 2540 grams of elemental iodine into a 1 gallon Monel-metal autoclave equipped with a stirrer, then introducing while cooling below 40° C., 710 grams of chlorine, and then stirring the mixture at a temperature of 40° C. for 1 hour and at a temperature of 50° C. for an additional hour.

The autoclave is then cooled externally to 30° C. and maintained at that temperature while 2325 grams of chlorotrifluoroethylene is added under a pressure of 40 to 70 lbs./in.² gage while stirring. After addition of the olefin, the reaction is further agitated for 2 hours at 30° C.

Unreacted olefin is removed and the liquid product is then washed with water, saturated aqueous sodium bisulfite solution, again with water, and then dried with anhydrous calcium sulfate. There is obtained thus 3000 grams of $C_2Cl_2F_3I$ which is shown by vapor-liquid partition chromatographic analysis to consist of 70% $CF_2ClCFClI$ and 30% $CFCl_2CF_2I$.

The same results are obtained when the above reaction is repeated using a glass lined autoclave.

EXAMPLE 6

*Reaction of $CF_2=CFCl$ with ICl at 50° C.*

Iodine monochloride is placed in a 3 liter glass flask and heated to 50° C. Chlorotrifluoroethylene is bubbled through the liquid ICl for a period of 2 hours until most of the ICl has reacted.

After removal of excess olefin, the reaction mixture is washed with water, with saturated aqueous sodium bisulfite solution, again with water, and then dried with anhydrous calcium sulfate. An isomer mixture is obtained which is shown by vapor-liquid partition chromotographic analysis to consist of 44% $CF_2ClCFClI$ and 56% $CFCl_2CF_2I$.

EXAMPLE 7

*Reaction of $CF_2=CFCl$ with ICl at 0° C. in the presence of iron wire gauze*

Example 3 is repeated using the same procedures and under the same conditions except that approximately 5% by weight of iron wire gauze is added to the reaction mixture. Chemical attack on the iron gauze during the course of the reaction destroyed the greater part of it. Analysis of the product using vapor-liquid partition chromatographic analysis shows a content of 37% of the isomer $CF_2ClCFClI$ and 63% of the isomer $CFCl_2CF_2I$.

EXAMPLE 8

*Reaction of $CF_2=CFCl$ with ICl at 50° C. in the presence of iron wire gauze*

Example 6 is repeated using the same conditions and following the same procedures except that approximately 5% by weight of small bits of iron wire gauze is added to the reaction mixture. The iron gauze is largely destroyed during the reaction. The reaction product is shown by vapor-liquid partition chromotographic analysis to consist of 34% of the isomer $CF_2ClCFClI$ and 66% of the isomer $CFCl_2CF_2I$.

EXAMPLE 9

*Reaction of $CF_2=CFCl$ with ICl at 30° to 40° C. in an iron autoclave*

A 1 gallon iron autoclave equipped with an iron stirrer is charged with 2540 g. (20 gram atoms) of iodine, sealed and evacuated. While stirring and cooling to maintain a temperature of 40° C., 710 grams (10 moles) of chlorine is admitted to the reactor. The reaction mixture is stirred for 1 hr. at 40° C. and for an additional hour at 50° C. While cooling the autoclave externally to keep the temperature below 40° C., 2325 grams (20 moles) of $CF_2=CFCl$ is added to the reactor while stirring under a pressure of 40 to 70 lbs./in.² gage. After the addition is complete, the reaction mixture is stirred and heated at 30 to 40° C. for about 2 hours longer.

Unreacted olefin is recovered from the reactor by condensation in refrigerated receivers. The remaining liquid product (3890 grams) is washed with water, aqueous sodium bisulfite solution, again with water, and then dried with anhydrous calcium sulfate. By distillation there is obtained about 300 grams of $CF_2ClCFCl_2$ and about 3000 grams of $C_2Cl_2F_3I$. Analysis of this iodide by vapor-liquid partition chromotography shows that it consists of about 40% of the isomer $CF_2ClCFClI$ and about 60% of the isomer $CFCl_2CF_2I$. Inspection of the iron autoclave and stirrer shows evidence of some corrosion indicating that chemical attack on the iron had occurred.

Examples 1 to 6 demonstrate the critical effect of temperature upon the amount of the undesired isomer $CFCl_2CR_2I$ obtained in the reaction product. At temperatures in the preferred range, ranging up to about 0° C., only a few percent, usually 2 to 3% or less, of the isomer $CFCl_2CF_2I$ is formed. As the temperature increases beyond +10° C., the yield of the undesired isomer increases rapidly. At temperatures of e.g. 15° to 20° C., (Example 4) the isomeric content is 21% $CFCL_2CF_2I$, and, as the temperature increases to 50° C., more than half the reaction product consists of this isomer.

Examples 7 to 9 show the effect of the presence of iron in a form which is chemically attacked by the reactants or reaction products. As is apparent from these examples, the presence of reactive forms of iron appears to catalyze the formation of the undesired isomer $CFCl_2CF_2I$. Even at low temperatures the major product is this latter isomer. It is possible that iron compounds, such as $FeCl_3$, which may form in situ during the reaction, may act as catalysts to promote the formation of the undesired isomer.

The new product produced by the process of the invention, consisting of a mixture of the isomers $$CF_2ClCFClI$$

and $CFCl_2CF_2I$, contains less than 10% and following the preferred procedures, less than 5% of $CFCl_2CF_2I$. This product is greatly superior to the product produced by the prior art processes as a telogen in telomerization reactions, particularly in telomerization reactions involving the olefin $CF_2=CFCl$. Because of the higher temperatures used and further because of the iron equipment employed in some cases, the iodide product prepared by prior art procedures contains of the order of 30% and often a considerably higher proportion of the undesirable isomer $CFCl_2CF_2I$.

The following examples illustrate the superiority of the product of the invention over that produced by prior art processes when reacted with $CF_2=CFCl$ to form telomers of the series $C_2F_3Cl_2(CF_2CFCl)_nI$.

In Example 10, the product of Example 1 is employed containing 98% of the isomer $CF_2ClCFClI$. In Example 11 unreacted iodide recovered from Example 10 is employed (containing 96% of the isomer $CF_2ClCFClI$).

Example 12 illustrates the results obtained when employing an iodide consisting of 100% of the isomer $CFCl_2CF_2I$.

Example 13 shows the results obtained when employing an iodide consisting of a mixture of 70% of the isomer $CF_2ClCFClI$ and 30% $CFCl_2CF_2I$ (a typical mixture obtained by the prior art processes).

Finally, Example 14 illustrates the results obtained when employing unreacted iodide from Example 13 containing approximately 70% of the undesirable isomer $CFCl_2CF_2I$.

EXAMPLE 10

One-half mole (139.5 grams) of the product iodide of Example 1, consisting of 98% of the isomer $CF_2ClCFClI$ and 2% $CFCl_2CF_2I$, and having a refractive index at 25° C $n_D^{25}$ 1.4492, and 116.5 grams (1 mole) of chlorotrifluoroethylene (2:1 molar ratio of $$CF_2=CFCl:CF_2ClCFClI)$$

is introduced into a 300 cc. Monel metal autoclave, and the mixture is heated while shaking at 160° to 165° C. for 6 hours. During this period the pressure falls from 500 p.s.i.g. to less than 100 p.s.i.g.

There is recovered from this reaction 23 grams of volatile material, mainly unreacted olefin, and 232 grams of liquid products. By distillation of the latter in a small Vigreux distillation unit there is obtained the following fractions:

(a) 96 grams of a mixture, boiling up to 28° C. at about 0.1 mm. Hg, having a refractive index $n_D^{25}$ 1.4385, of unreacted iodide and telomer iodide of the formula $CF_2ClCFCl(CF_2CFCl)_nI$ where $n$ equals 1. The isomer composition of the unreacted iodide is 96% $CF_2ClCFClI$ and 4% $CFCl_2CF_2I$.

(b) 41 grams of a fraction having a boiling point of 28° to 97° C. (mainly 50° to 97° C.) at about 0.1 mm. Hg and having a refractive index $n_D^{25}$ 1.4358 containing telomer iodides of the above formula where $n$ equals 2 to 3.

The still pot residue consists of 96 grams of a telomer oil comprising telomer iodides of the formula $$CF_2ClCFCl(CF_2CFCl)_nI$$

where $n$ equals 3 to about 10 and mostly from 3 to 6.

EXAMPLE 11

The lighter fraction (fraction a) obtained in the distillation of the product of Example 10 consisting of 96 grams of a mixture of unreacted iodide $C_2F_3Cl_2I$ (consisting of 96% $CF_2ClCFClI$) and the 1:1 adduct $$CF_2ClCFCl(CF_2CFCl)I$$

is introduced into a 300 cc. Monel metal autoclave together with 65 grams of chlorotrifluoroethylene. The autoclave is sealed and the mixture is heated at 160° to 165° C. while shaking for 6 hours. From this reaction there is recovered 20 grams of volatile materials, mainly unreacted olefin, and 140 grams of liquid products.

Upon fractional distillation of the latter the following fractions are collected:

(a) 40 grams of a pink liquid boiling up to 30° C. at about 0.1 mm. Hg, having a refractive index $n_D^{25}$ 1.438 and comprising a mixture of the telomer iodide $$CF_2ClCFCl(CF_2CFCl)_nI$$

where $n$ is mostly 1, and some unreacted $CF_2ClCFClI$.

(b) 30 grams of a pink oil having a boiling point of 30° to 100° C. at about 0.1 mm. Hg and a refractive index $n_D^{25}$ 1.435 comprising the telomer iodides $$CF_2ClCFCl(CF_2CFCl)_nI$$

where $n$ equals 2 to 3.

The still pot residue (65 grams) is a telomer oil, having a refractive index $n_D^{25}$ 1.433, consisting of telomer iodides $CF_2ClCFCl(CF_2CFCl)_nI$ where $n$ equals 3 to about 10, and mainly from 3 to 6.

EXAMPLE 12

A pure sample of the isomer 1,1-dichloro-1,2,2-trifluoro-2-iodoethane $CFCl_2CF_2I$ is obtained by reacting a mixture of the isomers $CF_2ClCFClI$ and $CFCl_2CF_2I$, consisting predominantly of $CFCl_2CF_2I$, with chlorosulfonic acid at a temperature of 50° to 52° C. for 2.5 hours. Under these conditions, the isomer $CF_2ClCFClI$ reacts almost quantitatively with chlorosulfonic acid to produce the chlorosulfate $CF_2ClCFClOSO_2Cl$, while very little reaction occurs between the isomer $CFCl_2CF_2I$ and chlorosulfonic acid (higher temperatures being required to form the chlorosulfate of this latter iodide).

The reaction mixture is poured over chipped ice and the lower organic layer is separated and stirred with 10% aqueous sodium hydroxide until it remains permanently basic after standing in contact with water. This treatment converts the chlorosulfate $CF_2ClCFClOSO_2Cl$ into the acid salt $$CF_2ClC\overset{O}{\overset{\|}{C}}ONa$$

which is soluble in the water layer. After washing with water and drying over anhydrous calcium sulfate, the remaining organic portion is distilled in a small Vigreux distillation unit to produce an almost colorless liquid having a boiling point of 101° C. and a refractive index $n_D^{25}$ 1.4446 shown by vapor-liquid partition chromotography to consist only of the isomer $CFCl_2CF_2I$. The above reaction of chlorosulfonic acid with iodides to form chlorosulfates and subsequent hydrolysis of the chlorosulfate is described and claimed in the co-pending application of Murray Hauptschein and Milton Braid entitled Halogenated Organic Compounds, Serial No. 735,702, filed May 16, 1958.

139.5 grams (0.5 mole) of pure $CFCl_2CF_2I$, prepared as described above, and 116.5 grams (1 mole) of chlorotrifluoroethylene are charged to a 300 cc. Monel metal autoclave and the mixture is then heated for 7 hours at 185° to 190° C. while shaking. During the heating of the autoclave, it is noted that no appreciable pressure drop occurs until the temperature reaches 180° C. During the 7 hour reaction period, the pressure drops from 700 p.s.i.g. gage to less than 100 lbs./in.² gage.

From this reaction there is recovered liquid products and about 25 grams unreacted olefin. From distillation of the liquid product there is obtained 100 grams of a fraction consisting mainly of unreacted iodide and some low molecular weight telomer iodides $$CFCl_2CF_2(CF_2ClCFCl)_nI$$

where the value of $n$ is in the range of from 1 to 2, distilling at 100° C. at a pressure of about 0.1 mm. Hg.

A still pot residue of 110 grams remains consisting of telomer iodides of the formula $$CFCl_2CF_2(CF_2CFCl)_nI$$

where $n$ varies from 2 to 30 and is mostly greater than 10, this residue being solid at room temperature.

EXAMPLE 13

139.5 grams (0.5 mole) of dichlorotrifluoroiodoethane consisting of 70% of the isomer $CF_2ClCFClI$ and 30% of the isomer $CFCl_2CF_2I$ (prepared by the method of Example 5) and 116.5 grams (1 mole) of chlorotrifluoroethylene are introduced into a 300 cc. Monel metal autoclave, and the mixture is heated at 170° C. for 6 hours while shaking. During this time the pressure is observed to drop from 550 to about 150 lbs./in.² gage. Upon venting the autoclave, 50 grams of unreacted chlorotrifluoroethylene is recovered.

The liquid products from the autoclave are distilled in a small Vigreux distillation unit and the following fractions are collected:

(a) 50 grams of unreacted iodide shown by vapor-liquid chromatographic analysis to consist of 30% of the isomer $CF_2ClCFClI$ and 70% of the isomer $CFCl_2CF_2I$.

(b) 60 grams of telomer iodides $C_2F_3Cl_2(CF_2CFCl)_nI$ where $n$ equals 1 having a boiling point of 78 to 82° C. at 25 mm. Hg and a refractive index $n_D^{25}$ 1.437.

(c) 35 grams of telomer iodides of the formula $$C_2F_3Cl_2(CF_2CFCl)_nI$$

where $n$ equals from 2 to 3 having a boiling range mainly from 135° to 140° C. at 25 mm. Hg and a refractive index $n_D^{25}$ 1.435.

(d) 20 grams of telomer iodides of the formula $$C_2F_3Cl_2(CF_2CFCl)_nI$$

where $n$ equals from 4 to 5 having a boiling point of 182° to 198° C. at about 0.1 mm. Hg, and a refractive index $n_D^{25}$ 1.431.

The still pot residue consists of 40 grams of telomer iodide oils and solids of the formula $$C_2F_3Cl_2(CF_2CFCl)_nI$$

where $n$ ranges from 5 to 15 (mainly from 6 to 10).

EXAMPLE 14

The unreacted iodide of Example 15 (fraction (a) containing 70% $CFCl_2CF_2I$ and 30% $CF_2ClCFClI$) is combined with similar fractions from similar runs. 139 grams (0.5 mole) of this mixture of isomeric iodides together with 116.5 grams (1 mole) of chlorotrifluoroethylene is introduced into a 300 cc. Monel metal autoclave, and the mixture is heated while shaking for 6 hours at a temperature of 174° to 178° C. The pressure during this period is observed to decrease from 600 p.s.i.g. gage to 400 p.s.i.g. gage. There is recovered from this reaction 75 grams of unreacted olefin and 180 grams of liquid products, a portion of which solidifies at room temperature.

Upon the distillation of the latter in a small Vigreux distillation unit there is obtained the following fractions:

(a) 95 grams of unreacted iodide shown by vapor-liquid partition chromatographic analysis to consist of 95% of the isomer $CFCl_2CF_2I$ and 5% of the isomer $CF_2ClCFClI$.

(b) 10 grams of telomer iodide $C_2F_3Cl_2(CF_2CFCl)_nI$ where $n$ equals 1, having a boiling point of 75° to 81° C. at 25 mm. Hg.

(c) 10 grams of similar telomer iodides where $n$ equals from 2 to 3 having a boiling range mainly from 132° to 137° C. at 25 mm. Hg.

The still pot residue consists of 60 grams of a dark, stiff wax containing similar telomer iodides where $n$ ranges from 4 to more than 20, the value of $n$ being mostly greater than 10.

As shown by Example 10 the freshly prepared product iodide produced in accordance with the invention, containing only a small percentage of the undesirable isomer $CFCl_2CF_2I$ provides a high yield of desired intermediate molecular weight telomers $$CF_2ClCFCl(CF_2CFCl)_nI$$

where the value of $n$ is mostly from 3 to 6. Furthermore, as shown by Example 11, unreacted iodide recovered from Example 10 may be reused without difficulty to react with further olefin and produce good yields of additional telomers of desired intermediate molecular weight.

Example 12 illustrates the poor results obtained when reacting the pure isomer $CFCl_2CF_2I$ with olefin. Higher temperatures are required before the reaction will proceed at an appreciable rate. Relatively low conversions are obtained. The products have a relatively wide spread of molecular weights and the principal products are high molecular weight solid telomers (where $n$ is greater than 10) rather than the desired intermediate weight telomer oils.

Example 13 illustrates the results obtained when employing iodide freshly prepared in accordance with prior art procedures. Because of the heretofore unsuspected presence of 30% of the undesirable isomer $CFCl_2CF_2I$, the initial yield of desired intermediate molecular weight telomers is reduced, since at the relatively low temperatures where the iodide $CF_2ClCFClI$ reacts with the olefin, the isomeric iodide $CRCl_2CR_2I$ reacts little or not at all, and thus is carried through the reaction essentially as a diluent.

Example 14 illustrates the results obtained in attempting to reutilize unreacted iodide recovered from Example 13. This recovered iodide (which has been depleted in the isomer $CF_2ClCFClI$ since this isomer reacted preferentially with the olefin in the primary reaction) now consists predominantly of the unreactive iodide $$CFCl_2CF_2I$$

When this mixture of isomers is reacted with additional olefin, as in Example 12, higher temperatures are now required for any appreciable reaction to proceed, and products similar to those of Example 12 are obtained. Very little of the desired intermediate molecular weight oils is obtained.

While the invention has been illustrated particularly with reference to production of telomers by reaction of the iodide product of the invention with the olefin $$CF_2=CFCl$$

to produce telomers of the series $$CF_2ClCFCl(CF_2CFCl)_nI$$

similar improved results are also obtained with the olefins $CF_2=CF_2$ and $CH_2=CF_2$. In the case of the latter two olefins the telomers produced are those of the series $CF_2ClCFCl(CF_2CF_2)_nI$ and $CF_2ClCFCl(CH_2CF_2)_nI$ respectively. By using the iodide product of the invention, containing only small amounts of the undesired isomer $CFCl_2CF_2I$, the molecular weight of telomers produced from these latter two olefins may also be more readily controlled; similarly, the unreacted starting iodide from the primary reaction with the olefin may more readily be reused to produce further quantities of the desired telomers.

The reaction of the iodide product of the invention with these olefins to produce telomers is preferably carried out at elevated temperatures of from 150° to 200° C. and preferably from 160° ot 175° C. and at elevated pressures ranging from 10 to a practical upper limit of e.g. 50,000 lbs./in.$^2$ gage, preferably from 100 to 5,000 lbs./in.$^2$ gage.

If desired, however, the telomerization reaction may be carried at lower temperatures, e.g. room temperature in the presence of ultraviolet light. If desired, a combination of heat and ultraviolet may be employed, such as ultraviolet irradiation at a temperature of say 75° to 100° C.

Another possible alternative is the use of organic peroxides e.g. benzoyl peroxide to initiate the reaction in which case the reaction will generally proceed at the decomposition temperature of the peroxide.

In order to obtain the optimum yield of desired intermediate molecular weight telomers ($n$ equals 3 to 8) the molar ratio of olefin to iodide should be in the range of from 1:1 to 4:1 and preferably to 1.5:1 to 3:1.

The telomer iodides provided by the invention may be stabilized e.g. by chlorination with elemental chlorine at 140°–180° C. to provide telomers such as those of the formula $CF_2ClCFCl(CF_2CFCl)_nCl$ or by fluorination by cobalt trifluoride at 250°–300° C. to provide telomers such as those of the formula $CF_2ClCFCl(CF_2CFCl)_nF$. Such stabilized telomers, particularly telomer oils where the value of $n$ is in the range of from 3 to 8, with the bulk of the telomers preferably having an $n$ value of from 4 to 6, are valuable as lubricants, plasticizers, hydraulic fluids, instrument fluids and the like where good to excellent heat and chemical stability is important. The telomer iodides themselves may be readily converted into derivatives such as acids, amides, esters etc. by first forming a chlorosulfate or a fluorosulfate and further reacting such halosulfate with $H_2O$, an amine, an alcohol etc. as described and claimed in the co-pending application of Hauptschein et al. Serial No. 735,702, filed May 16, 1958 for Halogenated Organic Compounds.

We claim:
1. A method for preparing the iodide $CF_2ClCFClI$ comprising the step of reacting $CF_2{=}CFCl$ with iodine monochloride at a temperature of from —40° C. to +10° C.
2. A method in accordance with claim 1 wherein the reaction is carried out at a temperature of from —20° C. to 0° C.
3. A method for preparing the iodide $CF_2ClCFClI$ comprising the step of reacting $CF_2{=}CFCl$ with iodine monochloride at a temperautre of from —40° C. to +10° C. in the absence of iron in a form which is chemically attacked by the reactants or reaction products.
4. A method in accordance with claim 3 in which the reaction temperature is in the range of from —20° C. to 0° C.
5. A method for preparing the iodide $CF_2ClCFClI$ comprising the step of reacting $CF_2{=}CFCl$ with iodine monochloride dissolved in a solvent at a temperature of from —20° to 0° C. in the absence of iron in a form which is chemically attacked by the reactants or the reaction products.
6. A method in accordance with claim 5 in which said solvent is $CF_2ClCFClI$.
7. A method in accordnace with claim 5 in which said solvent is methylene chloride.

References Cited in the file of this patent

Barr et al.: Jour. Amer. Chem. Soc., 73, 1352, March 1951.

Haszeldine: Jour. Chem. Soc. (London), (1952), 4423–31, only pp. 4427 and 4428 needed.

Haszeldine: Jour. Chem. Soc. (London), (1955), 4291–4302, only pp. 4298 and 4299 needed.

Hauptschein et al.: Jour. Amer. Chem. Soc., 79, 2549–53, May 20, 1957, only page 2552 needed.

UNITED STATES PATENT OFFICE
CERTIFICATE OF CORRECTION

Patent No. 3,002,030            September 26, 1961

Murray Hauptschein et al.

It is hereby certified that error appears in the above numbered patent requiring correction and that the said Letters Patent should read as corrected below.

Column 3, line 13, for "presure" read -- pressure --; column 4, line 31, for "$d_4^{24}$" read -- $d_4^{25}$ --; column 5, line 31, for "use" read -- used --; column 6, line 57, for "$CFCl_2CR_2I$" read -- $CFCl_2CF_2I$ --; column 7, line 40, for "$CF_2CiCFClI$" read -- $CF_2ClCFClI$ --; column 10, line 36, for "$CRCl_2CR_2I$" read -- $CFCl_2CF_2I$ --.

Signed and sealed this 20th day of February 1962.

(SEAL)
Attest:

ERNEST W. SWIDER
Attesting Officer

DAVID L. LADD
Commissioner of Patents